United States Patent Office 3,175,004
Patented Mar. 23, 1965

3,175,004
PREPARATION OF QUATERNARY AMMONIUM NITRATES
Sydney H. Shapiro and Murray C. Cooperman, Chicago, Ill., assignors to Armour and Company, Chicago, Ill., a corporation of Delaware
No Drawing. Filed Mar. 24, 1961, Ser. No. 98,013
7 Claims. (Cl. 260—567.6)

Our invention relates to a process for preparing substantially halide-free quaternary ammonium nitrates.

Heretofore, quaternary ammonium nitrates generally have been prepared from quaternary ammonium chlorides by one of two routes: (1) directly to the nitrate by a double-decomposition reaction using sodium nitrate or lead nitrate in an aqueous reaction system; (2) indirectly to the nitrate through an intermediate hydroxy step. Both methods of preparation have certain undesirable features. The aqueous sodium nitrate route is undesirable for preparing chloride-free quaternaries due to the commercial unfeasibility of separating chloride and nitrate reaction salts having similar water solubilities. The hydroxide and lead nitrate routes are expensive because the hydroxide route involves a two-step process and the lead nitrate method requires relatively expensive reagents.

In addition to being expensive the hydroxide route produces a dark product that is unsuitable for certain uses such as anti-static treatment of resins because of the resulting resin discoloration. Quaternary ammonium nitrates prepared by the direct route, wherein sodium nitrate in an aqueous reaction system is used, are also unsuitable anti-static reagents, when such direct-route nitrate products are used because of the high noise level experienced with sound recording plastics containing them. It appears that the chemical equilibrium resulting from the direct-route aqueous reaction allows excess chloride ions to remain in solution so as to give an inferior product.

Improved methods of preparing quaternary ammonium compounds, wherein a halide in the presence of water is dissolved in a polar solvent and an anion exchange resin which is insoluble in the solvent and which contains an anion of a salt other than a halide is reacted with the halide to produce other salts, are also usually unsuitable for economically preparing highly purified and halide-free quaternary ammonium nitrates.

Chloride-containing quaternaries are generally ineffective in impeding metal corrosion and in many cases actually tend to promote corrosion. Where corrosion is a factor it is highly desirable to have available chloride-free quaternaries.

It is therefore a primary object of this invention to provide a method for economically preparing substantially halide-free quaternary ammonium nitrates. Our invention has the important advantage of providing simple and inexpensive processes for preparing quaternary ammonium compounds containing very low levels of soluble chlorides. Other advantages and objects will appear in the following description.

Accordingly, our invention involves the process of reacting quaternary ammonium chloride with ammonium, sodium, or potassium nitrate in a substantially non-aqueous or anhydrous solvent system essentially containing dimethyl formamide (DMF) or alcohol containing 1 to 4 carbon atoms. The reaction results in the cationic fragment of the quaternary ammonium chloride reacting with the anionic portion of the nitrate salt to give desired quaternary ammonium nitrate product while the corresponding chloride reaction salt is precipitated from the reaction system.

Salts suitable for use in the metathesis conversion of quaternary ammonium chloride to the corresponding nitrate in the presence of a small amount of non-aqueous solvent are ammonium nitrate, sodium nitrate and potassium nitrate. We find that ammonium nitrate is especially suitable for use in this invention because of the rapidity of conversion compared to the reaction mode of the other suitable salts. Potassium nitrate may be effectively used but its use necessitates a greater quantity of solvent, especially dimethyl formamide, and therefore the ammonium salt is optimally used. Because an excess of ammonium nitrate is ordinarily used it is preferable to neutralize unreacted ammonium nitrate after completion of the reaction. After the reaction unreacted ammonium nitrate is preferably removed by treating the reaction system with sodium hydroxide to remove the unreacted salt by precipitation as sodium nitrate with removal of ammonia. Sodium nitrate is much less soluble in DMF and the above named alcohols at a pH of about 8 to 9 than is the case with ammonium nitrate.

The double decomposition reaction is carried out in a non-aqueous solvent system. Suitable solvents are dimethyl formamide and alcohols containing 1 to 4 carbon atoms. Thus, suitable alcohols include the following: methyl alcohol, ethyl alcohol, isopropyl alcohol, n-propyl alcohol, isobutyl alcohol and n-butyl alcohol.

Virtually all types of quaternary ammonium chlorides may be converted to the nitrate form by this process. Highly purified individual quaternary ammonium compounds as well as mixtures of them, including those prepared from natural fatty acid sources, may be used. The following are examples of quaternary ammonium chlorides which we prefer to use in our invention: dimethyldidodecylammonium chlorides, trimethyldodecylammonium chloride, dimethyldioctadecylammonium chloride, trimethyloctadecylammonium chloride, dodecyldimethylbenzylammonium chloride, octadecyldimethylbenzylammonium chloride, trimethylcocoammonium chloride, dimethylditallowammonium chloride, trimethylsoyammonium chloride, methyldibutylbenzylammonium chloride, methyldihexylbenzylammonium chloride, methyldioctylbenzylammonium chloride, methyldihexadecylbenzylammonium chloride, methylethyldidodecylammonium chloride, methylhexadecylpyridinium chloride, trimethyldodecyloxyphenylammonium chloride, dimethyldodecylmethylallylammonium chloride, phenyldialkyloctadecylammonium chloride, dimethylchlorobenzyloctylammonium chloride, dimethylheptadecyl-B-naphthylammonium chloride, N-stearamidomethyl-N-ethoxymethyl-N-dimethylammonium chloride, N-geranyl-N-dodecylpiperidinium chloride, N-N-dimethylpyrrolidinium chloride, and methylalkylpolyoxyalkyleneammonium chloride.

Optimally we carry out the reaction in not less than 10% by weight of total reactant, non-aqueous solvent. Ordinarily, not less than about 10% solvent in the reaction system should be used but amounts greatly in excess of this level usually offer no particular advantage.

The process may be initiated by stirring quaternary ammonium chloride into the dimethyl formamide or suitable alcohol solvent system. This mixture is then warmed to a temperature of above about 50° C. Then at least a stoichiometric amount, and preferably a slight excess thereof, of suitable nitrate salt is added portionwise to the warmed mixture. Heating may be discontinued during the addition of the nitrate salt. As the decomposition is effected, the insoluable chloride reaction salt settles out and this causes further solubility of more nitrate salt. If ammonium nitrate is used, at this point it is preferable to add sufficient sodium hydroxide to bring the pH of the reaction system to between about 8 to 9 so as to cause the precipitation of substantial quantities of unreacted ammonium salt. The reaction mixture then is cooled and held for a period of time to counteract super-cooling which may inhibit proper precipitation of the chloride reaction salts. Insoluable chloride may then be easily removed from the reaction mixture. The remaining quaternary ammonium nitrate product which is essentially chloride-free may then be recovered by well-known methods.

The following examples are given merely to aid in understanding our invention and it will be appreciated by those skilled in the art that the invention is not restricted to the particular materials, proportions or procedures set forth therein.

*Example I*

2,005 grams of methylcoco-bis (B-hydroxyethyl) ammonium chloride, 75% (4.6 moles) and 270 grams of DMF were stirred and warmed to 65° C. 432 grams of powdered ammonium nitrate (5.4 moles) was added portion-wise over a 45 minute period, during which the temperature was allowed to drop to 50° C. The mixture was stirred and heated to 80° C. for 30 additional minutes. It was slowly allowed to cool and stand overnight. The reaction mixture was filtered at room temperature and a final yield of 2,197 grams of light amber oil was recovered. This represented a yield of 83% of theory. The assay showed the light amber oil to be the corresponding quaternary ammonium nitrate.

*Example II*

393 pounds of Ethoquad C/12[1], 75% active, and 53 pounds of dimethyl formamide were charged to a 75 gallon stainless steel reactor equipped with dual turbine agitators and a heating and/or cooling jacket. Contents were heated to 150° F., at which temperature heat supply was secured. 85 pounds of fertilizer grade ammonium nitrate were added over an hour period with agitation, by which time contents of the reactor had cooled to 100° F. Head space of the reactor was then purged of air with nitrogen at 15 p.s.i.g. and heated to 165° F., at which time all heat was removed and the contents agitated for 6 hours. At the end of this period this temperature had dropped to 156° F. Reactor contents were then cooled to 75° F., and 4 pounds of filter aid were added and allowed to mix for 10 minutes. The product was then filtered. A product yield of 91.5% resulted.

*Example III*

110 pounds of Ethoquad C/12, 75% active, and 15 pounds of dimethyl formamide were charged to a 20 gallon stainless steel autoclave equipped with propeller type agitator, heating jacket and cooling coils. The materials were heated to 150° F. with an open vent. The heat was shut off and 23 pounds of fertilizer grade ammonium nitrate was added gradually over a period of 1 hour and 15 min., during which time agitation in the autoclave was maintained and the temperature fell to 100° F. Air was then evacuated from the autoclave by purging the head space twice with 15 p.s.i.g. nitrogen, leaving a few pounds gauge nitrogen in the head space after the final purge by sealing the autoclave vent line. Contents of the autoclave were then heated to 175° F. and held at that temperature for 1 hour. The heat was then secured and digestion was allowed to take place for 3 hours. At the end of the 3 hour period the temperature had dropped to 150° F. Contents were then cooled to 75° F. and 1.5 pounds filter aid was added and allowed to mix for 15 minutes. Product was filtered at 75° F. through a horizontal plate, closed filter. A 91% yield of Ethoquad C/12 nitrate was obtained.

*Example IV*

256 grams of Ethoquad C/12 (.57 mole based on activity), 34 grams isopropanol and 54 grams ammonium nitrate (.68 mole) were charged into a 1,000 ml. reaction flask. This was heated with stirring to 70–80° C. for 1½ hours. The batch was then further stirred another 1½ hours at constant temperature. It was then cooled with stirring to 65° C. and allowed to stand overnight. The reaction mixture was then filtered through a pressure filter, using filter aid. This yielded 256 grams of an amber clear solution. At this point the solution contained 3.73% ammonium nitrate.

*Example V*

500 grams of Ethoquad C/12 nitrate, prepared by the method of Example IV, 50 grams isopropanol and 9 grams of sodium hydroxide pellets were stirred and heated at 50 to 70° C. for 14 hours in a reaction flask. The batch was then stirred and cooled to 23° C. and filtered to yield an amber-clear solution. The original Ethoquad C/12 nitrate recovered from the reaction mixture of Example IV contained 3.73% unreacted ammonium nitrate. After treatment with the sodium hydroxide the quaternary ammonium nitrate product was found to contain 0.144% ammonium nitrate.

*Example VI*

256 grams Ethoquad C/12 (0.57 mole, based on activity), 34 grams butanol and 54 grams ammonium nitrate (0.68 mole) were stirred and heated in a 1,000 ml. reaction flask at 70 to 80° C. for 3 hours. The flask was then cooled to 50° C. with stirring and allowed to sit overnight. The batch was then filtered at room temperature to yield an amber clear solution.

*Example VII*

256 grams Ethoquad C/12 75% active, 34 grams anhydrous 3-A ethanol and 54 grams ammonium nitrate were charged into a 1,000 ml. reaction flask and stirred and heated at 70 to 80° C. for 1½ hours. The batch was filtered at room temperature to yield an amber clear solution.

*Example VIII*

34 grams of isopropanol and 58 grams of sodium nitrate were charged into a 1,000 ml. glass reaction flask and stirred and heated at 60 to 70° C. 256 grams of warmed, 50° C. Ethoquad C/12 were added to the suspension with stirring and temperatures were maintained at 60 to 70° C. for 1½ hours. The batch was then stirred another two hours at 70–80° C. and was then cooled, filtered and checked for chloride ion content. 50 additional grams of isopropanol was added and the reaction mixture was stirred at 70 to 80° C. for another 15 hours. It was then cooled to 20° C. and filtered to yield an amber clear solution.

*Example IX*

393 pounds of Ethoquad C/12 75% active, 53 pounds of 99% isopropanol, 33 pounds of ammonium nitrate (purified, granular) and 4 pounds of filtercel were charged into a 75 gallon stainless steel autoclave equipped with twin turbine type agitators. The autoclave vent line was closed and the charge heated to 175° F. with steam applied to the jacket of the vessel. After approximately 3 hours of digestion at 160 to 170° F., a sample was withdrawn and found to contain 1.35% chloride ion. After 6 additional hours of digestion the chloride ion concentration had dropped to 1.15% with an ammonium nitrate content of 4.03%. At this point the reaction mixture was cooled to 75° F. by means of jacket cooling water and filtered through a Sparkler filter press to remove remaining ammonium chloride salt. At this point 423

---

[1] The trademark applied to ethoxylated quaternary ammonium salts of the following general structural formula:

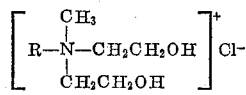

with R representing an alkyl chain derived from coco fatty acids.

pounds of filtered Ethoquad C/12-nitrate having the following analysis was recovered:

| | |
|---|---|
| Percent solids | 68.8 |
| Percent activity | 63.2 |
| Percent chloride ion | 1.16 |
| Percent ammonium nitrate | 3.76 |
| Percent ash | trace |
| Gardner color | 9–10 |
| pH (paper, as is) | 6–7 |

The 423 pounds of Ethoquad C/12-nitrate together with 34 pounds of 99% isopropanol and 8 pounds of flaked caustic were recharged to the same 75 gallon autoclave and heated to 145° F. The vent valve of the autoclave was adjusted to permit passage of a small stream of exit gases (mostly ammonia with some isopropanol) and digestion at 145–155° F. was thusly maintained. At the end of the first and second hours withdrawn samples analyzed 0.14% and 0.077% free caustic, respectively. Digestion at the above conditions was maintained for an additional one and one-half hours at the end of which time the charge was cooled at 65° F. with jacket water. The charge was then filtered through a Sparkler filter to remove free sodium nitrate. A total of 441 pounds of filtered product with the following analyses were recovered:

| | |
|---|---|
| Percent solids | 65.7 |
| Percent activity | 63.2 |
| Percent chloride ion | 1.16 |
| Percent ammonium nitrate | 0.39 |
| Percent ash | 0.23 |
| Gardner color | 9–10 |

Having described our invention what we claim is:

1. In a process for preparing quaternary ammonium nitrates having low-chloride content, the improvement of reacting, at a temperature above 50° C., quaternary ammonium chloride and a reactant salt selected from the group consisting of ammonium nitrate, sodium nitrate and potassium nitrate in a substantially non-aqueous reaction medium selected from the group consisting of dimethyl formamide and alkyl alcohols having 1 to 4 carbon atoms so as to form quaternary ammonium nitrate and a chloride salt, said quaternary ammonium nitrate being soluble and said chloride salt being substantially insoluble in said reaction medium.

2. The process of claim 1 wherein the reaction system includes at least a stoichiometric portion of said reactant salt.

3. The process of claim 1 wherein said reaction medium is at least about 10% by weight, based on total reactants.

4. The process of claim 1 wherein said reaction medium is dimethyl formamide.

5. The process of claim 1 wherein said reaction medium is a substantially non-aqueous alkyl alcohol having 1 to 4 carbon atoms.

6. In a process for preparing quaternary ammonium nitrates having low-chloride content, the improvement of reacting, at a temperature above 50° C., quaternary ammonium chloride and ammonium nitrate in a substantially non-aqueous reaction medium selected from the group consisting of dimethyl formamide and alkyl alcohols having 1 to 4 carbon atoms so as to form quaternary ammonium nitrate and ammonium chloride, said quaternary ammonium nitrate being soluble and said ammonium chloride being substantially insoluble in said reaction medium, and neutralizing unreacted ammonium nitrate with alkali whereby separation of said unreacted nitrate from said reaction medium is facilitated.

7. In a process for preparing quaternary ammonium nitrates having low-chloride content, the steps of reacting, at a temperature above 50° C., quaternary ammonium chloride and a reactant salt selected from the group consisting of ammonium nitrate, sodium nitrate and potassium nitrate in a substantially non-aqueous reaction medium selected from the group consisting of dimethyl formamide and alkyl alcohols having 1 to 4 carbon atoms so as to form quaternary ammonium nitrate and a chloride salt, said quaternary ammonium nitrate being soluble and said chloride salt being substantially insoluble in said reaction medium, and separating said chloride salt as a precipitate directly from said reaction medium.

References Cited in the file of this patent

FOREIGN PATENTS 735,631  Great Britain _____ Aug. 24, 1955